(12) United States Patent
Yoshida et al.

(10) Patent No.: US 9,262,658 B2
(45) Date of Patent: Feb. 16, 2016

(54) READ SENSOR AND MANAGEMENT SYSTEM

(71) Applicant: HOKO ELECTRONICS CO., LTD., Yokohama, Kanagawa (JP)

(72) Inventors: Masaru Yoshida, Yokohama (JP); Naoki Shizuka, Yokohama (JP); Tadanori Akagi, Hachioji (JP)

(73) Assignee: HOKO ELECTRONICS CO., LTD., Yokohama (JP)

( * ) Notice: Subject to any disclaimer, the term of this patent is extended or adjusted under 35 U.S.C. 154(b) by 0 days.

(21) Appl. No.: 14/491,098

(22) Filed: Sep. 19, 2014

(65) Prior Publication Data

US 2015/0083807 A1    Mar. 26, 2015

(30) Foreign Application Priority Data

Sep. 24, 2013    (JP) .................................. 2013-197358

(51) Int. Cl.
| | |
|---|---|
| *G06K 7/00* | (2006.01) |
| *G06K 7/10* | (2006.01) |
| *H01Q 1/38* | (2006.01) |
| *H01Q 9/28* | (2006.01) |
| *H01Q 1/36* | (2006.01) |

(52) U.S. Cl.
CPC ........ *G06K 7/10336* (2013.01); *G06K 7/10356* (2013.01); *H01Q 1/36* (2013.01); *H01Q 1/38* (2013.01); *H01Q 9/28* (2013.01)

(58) Field of Classification Search
CPC ....... H01Q 1/2208; H01Q 9/16; H01Q 11/14; H01Q 1/2216; H01Q 9/0407; H01Q 9/045; H01Q 1/36; H01Q 1/38; H01Q 9/28; H05K 2201/09263; G06K 7/10316; G06K 7/10356; G06K 19/00749; G06K 19/07773; G06K 19/07796; G06K 7/10336

USPC .......................................................... 235/439
See application file for complete search history.

(56) References Cited

U.S. PATENT DOCUMENTS

| | | | | |
|---|---|---|---|---|
| 2002/0089453 | A1* | 7/2002 | Tseng et al. .................. | 343/702 |
| 2002/0113739 | A1* | 8/2002 | Howard ........................ | 343/702 |
| 2002/0122009 | A1* | 9/2002 | Winebrand et al. ........... | 343/767 |
| 2003/0080918 | A1* | 5/2003 | Forster et al. ................. | 343/895 |
| 2003/0139163 | A1* | 7/2003 | Noda et al. .................... | 455/269 |
| 2006/0054710 | A1* | 3/2006 | Forster et al. ................. | 235/492 |
| 2008/0012773 | A1* | 1/2008 | Andrenko et al. ........ | 343/700 R |
| 2008/0100525 | A1* | 5/2008 | Bae et al. ...................... | 343/787 |
| 2013/0154804 | A1* | 6/2013 | Jung et al. .................... | 340/10.1 |
| 2014/0085052 | A1* | 3/2014 | Singh et al. .................. | 340/10.1 |

FOREIGN PATENT DOCUMENTS

| | | |
|---|---|---|
| JP | 2003-072919 A | 3/2003 |
| JP | 3606242 B2 | 1/2005 |

* cited by examiner

*Primary Examiner* — Thien M Le
*Assistant Examiner* — Claude J Brown
(74) *Attorney, Agent, or Firm* — Westerman, Hattori, Daniels & Adrian, LLP

(57) ABSTRACT

The present invention provides a read sensor that can acquire data from the read object reliably, with a simple configuration, by making it possible to acquire data from the read object using both a magnetic field and an electric field. A read sensor 10 has conductive elements 30 that have a shape in which first elements 31 and second elements 32 are connected with each other along a first plane 20a, as if drawn unicursally in one stroke, so that the angle θ1 formed between a first element 31 and a second element 32 becomes a predetermined sharp angle, and a metal plate 40 that covers a second plane 20b of the dielectric plate 20, which is the back plane of the first plane 20a.

9 Claims, 11 Drawing Sheets

READ SENSOR AND MANAGEMENT SYSTEM

BACKGROUND OF THE INVENTION

The present invention relates to a read sensor and a management system that are used to read information stored in radio tags and/or the like in a non-contact manner.

In recent years, management systems to manage articles by attaching radio tags to the articles to store on an article management shelf have come to be known. If articles can be managed by means of radio tags like this, it is possible to reduce the cost of labor, effort and working time required for the management of articles significantly.

Under this circumstance, patent literature 1 discloses a management system that has a radio tag which is attached to an article to store, in which dedicated information is stored, and which is capable of non-contact communication, a loop antennas that communicates with the radio tag in a non-contact manner using a magnetic field, and a management means that manages the dedicated information acquired from the radio tag via the loop antenna. The method of communicating with radio tags using a magnetic field, disclosed in Japanese Unexamined Patent Application Publication No. 2003-72919, is generally used when acquiring data from radio tags that are close in distance.

Also, a method of communicating with radio tags by means of a dipole antenna using an electric field has been known heretofore. In comparison with the method of communicating with radio tags using a magnetic field, the method of communicating with radio tags using an electric field is generally used when acquiring data from radio tags that are far in distance.

In this way, heretofore, when acquiring data from radio tags, communication with the radio tags has been conducted using either a magnetic field or an electric field, depending on the purpose.

SUMMARY OF THE INVENTION

However, with conventional configurations, there is a problem that, even when one of the method of communicating with radio tags by means of a magnetic field and the method of communicating with radio tags by means of an electric field is used as an optimal method, there are still some radio tags from which data cannot be acquired. To be more specific, with the method of communicating with radio tags by means of a magnetic field, there is a problem that it is difficult to acquire data from radio tags that are located far in distance, and, with the method of communicating with radio tags by means of an electric field, there is a problem that, even if radio tags are located close in distance, it is still difficult to acquire data from the radio tags that are present in directions to deviate significantly from the direction of maximum radiation of the antenna.

Also, with conventional configurations, when using the method of communicating with radio tags by means of an electric field, it is necessary to manipulate the antenna to reduce the number of radio tags from which data cannot be acquired, and therefore the shape of the antenna becomes complex and this results in increased manufacturing cost.

It is therefore an object of the present invention to provide a read sensor and a management system, whereby data can be acquired reliably from the read object, with a simple configuration, by making it possible to acquire data from the read object using both a magnetic field and an electric field.

To achieve the above object, a first aspect of the present invention is to provide a read sensor comprising: a dielectric plate that has a predetermined permittivity, conductive elements of a belt shape, that are provided on a first plane of the dielectric plate, and that, by receiving a supply of current, generate electromagnetic waves and acquire data from a read object in a non-contact manner, and a metal plate that covers a second plane of the dielectric plate, which is a back plane of the first plane, and, in this read sensor, the conductive elements are formed with first elements of a linear shape and second elements of a linear shape, and have a shape in which the first elements and the second elements are connected with each other along the first plane, as if drawn unicursally in one stroke, so that an angle formed between a first element and a second element becomes a predetermined sharp angle.

In a read sensor of a second aspect of the present invention, in addition to the first aspect, a perturbation element that is provided to extend straight between the first element and the second element, from a side edge part of the first element or the second element having a current supply part where current is supplied.

In a read sensor of a third aspect of the present invention, in addition to the first or second aspect, the conductive elements are supplied with current from an edge part of the first element in a long direction not connecting with the second element, or from an edge part of the second element in the long direction not connecting with the first element.

In a read sensor of a fourth aspect of the present invention, in addition to any of the first to third aspects, the dielectric plate has a rectangular shape on a plan view; and the conductive elements have connecting parts where the first elements and the second elements are connected, and are provided on the first plane so that a straight line to connect between neighboring connecting parts becomes parallel to two opposing sides of the dielectric plate.

In a read sensor of a fifth aspect of the present invention, in addition to any of the first to fourth aspects, the predetermined sharp angle is greater than 8° and is equal to or less than 20°.

In a read sensor of a sixth aspect of the present invention, in addition to any of the first to fifth aspects, the number of the first elements is equal to or greater than 2 and equal to or less than 4; and the number of the second elements is equal to or greater than 2 and equal to or less than 4, and is the same as the number of the first elements.

In a read sensor of a seventh aspect of the present invention, in addition to any of the first to sixth aspects, a plurality of conductive elements are aligned on the first plane at predetermined intervals.

In a read sensor of a eighth aspect of the present invention, in addition to the seventh aspect, an antenna switching part that switches between the conductive elements and supplies current to one after another.

In a read sensor of a ninth aspect of the present invention, in addition to any of the first to eighth aspects, the dielectric plate is made of expandable plastic.

In a read sensor of a tenth aspect of the present invention, in addition to any of the first to ninth aspects, the dielectric plate has a rectangular shape on a plan view, and has its length in a short direction made to match a length of a depth of a shelf where an article to which the read object is attached is stored.

a eleventh aspect of the present invention is to provide a management system comprising: a read sensor of the first to tenth aspects of the present invention, and a reading device that reads information which the read sensor acquires from the read object, and a terminal device that manages the information read by the reading device.

According to the present invention, it is possible to acquire data from the read object reliably, with a simple configuration, by making it possible to acquire data from the read object using both a magnetic field and an electric field.

DETAILED DESCRIPTION OF THE PREFERRED EMBODIMENT

Figure 1:
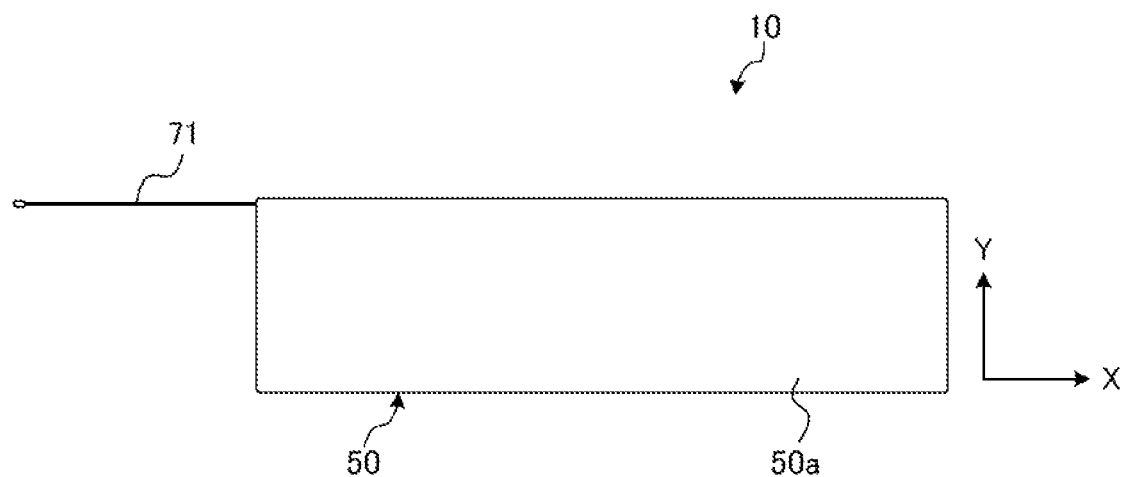
FIG. 1 is a plan view of a read sensor according to a first embodiment of the present invention.

Now, a read sensor and a management device according to an embodiment of the present invention will be described below in detail with reference to the accompanying drawings. Note that, in the drawings, an X axis, a Y axis and a Z axis define a three-axis orthogonal coordinate system, and the positive direction along the Z axis is the upward direction.

<Overall Configuration of Read Sensor>

An overall configuration of a read sensor 10 according to an embodiment of the present invention will be described below in detail with reference to FIG. 1 to FIG. 4.

A read sensor 10 has a dielectric plate 20, conductive elements 30, a metal plate 40, a cover 50, a switch 60, connecting cables 70 and a connecting cable 71.

The dielectric plate 20 is rectangular seen (on a plan view) from the positive side on the Z axis. The dielectric plate 20 has a predetermined permittivity. The dielectric plate 20 is made of expandable plastic in order to cushion the impact on an article when the article is placed on the read sensor 10, and to achieve lighter weight. The dielectric plate 20 is made of, for example, polypropylene (PP) or polyethylene terephthalate (PET).

Since the dielectric plate 20 may be placed between an article and the shelf where that article is already stored, the thickness of the dielectric plate 20 in the Z-axis direction is made as thin as possible, so as to prevent the situation where the article cannot be stored because the read sensor 10 is used. The thickness of the dielectric plate 20 is, for example, 5 mm. The length of the dielectric plate 20 in the Y-axis direction (the short direction) is made to match the length of the depth of the shelf where the articles to which radio tags are attached are stored.

The conductive elements 30 are belt-shaped, provided on a first plane 20a of the dielectric plate 20, and formed in a zigzag shape across the first plane 20a. In the cases illustrated in FIG. 1 to FIG. 4, several conductive elements 30 are provided, and these are aligned at predetermined intervals on the first plane 20a. With the present embodiment, four conductive elements 30a, 30b, 30c and 30d are provided along the X-axis direction (the long direction of the dielectric plate 20), and aligned at predetermined intervals on the first plane 20a. Note that the number of conductive elements 30 to provide on one dielectric plate 20 is not limited to four, and the number can be one or any number other than four, and can be chosen as appropriate depending on the purpose of use of the read sensor 10.

The conductive elements 30 are made of, for example, polyethylene terephthalate, and are formed by bonding copper foil on the first plane 20a of the dielectric plate 20.

The conductive elements 30 produce electromagnetic waves by receiving a supply of current from the switch 60, and, by communicating with unillustrated radio tags, which are the read object, in a non-contact manner, acquire data from the radio tags.

When communicating with radio tags that are located close in distance (for example, 10 mm apart), the conductive elements 30 communicate with the radio tags using a magnetic field. At this time, given that the conductive elements 30 are formed in a zigzag shape within the range of the width W of the dielectric plate 20 in the Y-axis direction (width direction), it is possible to acquire data, with reliability, from the radio tags that are present in close distance in the positive direction along the Z axis in the range of the width W.

When communicating with radio tags that are located far in distance (for example, 150 mm apart), the conductive elements 30 communicate with the radio tags using an electric field. When communicating with radio tags using an electric field, the conductive elements 30 function as a dipole antenna, and use, for example, the UHF band.

Consequently, with respect to radio tags that are located close in distance, the conductive elements 30 acquire data using a magnetic field, and therefore can acquire data, with reliability, regardless of in which direction the radio tags are present. Also, with respect to radio tags that are located far in distance, the conductive elements 30 acquire data using an electric field, and therefore can acquire data with reliability. Note that the configuration of the conductive elements 30 will be described in detail later.

Figure 4:
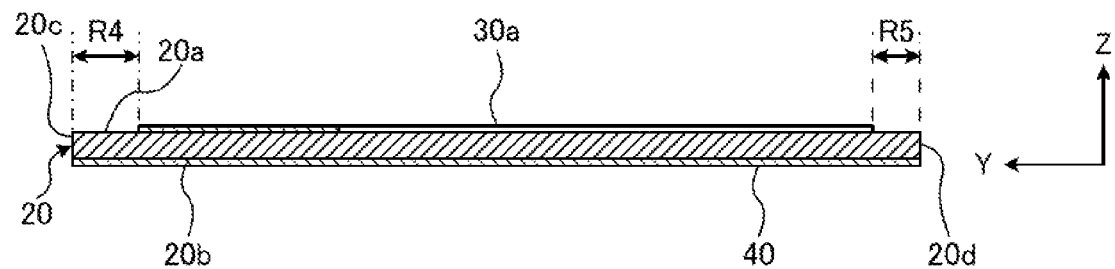
FIG. 4 is an A-A cross-sectional view of FIG. 3.

The metal plate 40 covers the whole of a second plane 20b, which is the back plane of the first plane 20a, as shown in FIG. 4. The metal plate 40 blocks the spread of an electric field and a magnetic field from the conductive elements 30 in the negative direction along the Z axis.

Figure 2:
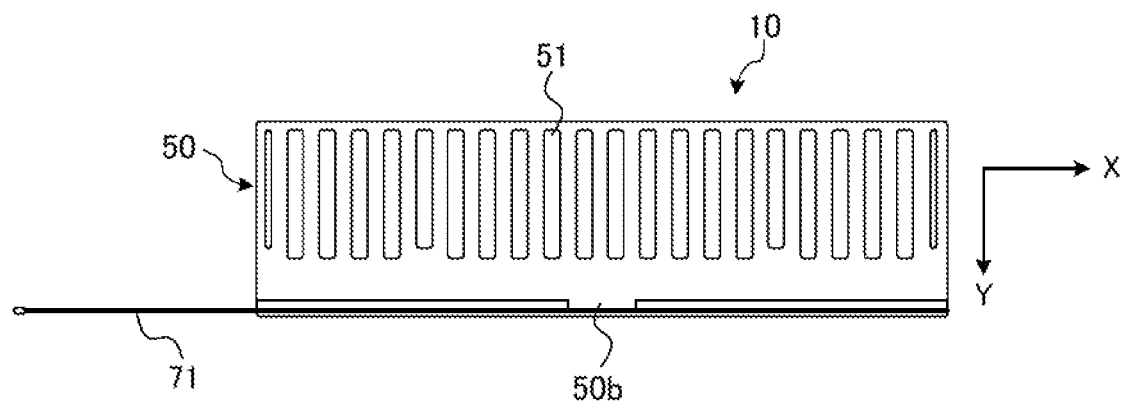
FIG. 2 is a bottom plan view of the read sensor according to the first embodiment of the present invention.

As shown in FIG. 1 and FIG. 2, the cover 50 has a plane 50a, on which articles are placed, and a bottom plane 50b, which is a plane to attach to the storage shelf where the articles are stored. The bottom plane 50b is provided with ribs 51, as shown in FIG. 2. The ribs 51 are rectangles when seen (on a bottom plan view) from the negative side along the Z axis, stick out from the bottom plane 50b in the negative direction along the Z axis, and are aligned at predetermined intervals on the bottom plane 50b along the X-axis direction (the long direction of the cover 50). By this means, the cover 50 can make it easy to connect between the switch 60 and the conductive elements 30 by means of the connecting cables 70, by making the step between the dielectric plate 20 and the switch 60 in the Z-axis direction smaller, and, furthermore, prevent disconnections between the switch 60 and the connecting cables 70 as much as possible. The cover 50 accommodates inside the dielectric plate 20, on which the conductive elements 30 and the metal plate 40 are provided, the switch 60, the connecting cables 70, and part of the connecting cable 71. In the cover 50, an illustrated through hole is formed, so that the connecting cable 71 connecting between the switch 60 and an unillustrated reading device can be pulled out. The cover 50 is made of a material apart from metal, so that data can be acquired, in a non-contact manner, between the conductive elements 30 and the radio tags. The cover 50 is made of, for example, polycarbonate (PC), polyvinyl chloride (PVC) or polyethylene (PE).

The switch 60 is an antenna switching part, is connected with the conductive elements 30, and supplies the current supplied from an unillustrated power source via the connecting cable 71, to the conductive elements 30 via the connecting cables 70. The switch 60 acquires data from the radio tags from the conductive elements 30 via the connecting cables 70, and sends out the data from the radio tags acquired from the conductive elements 30, to an unillustrated reading device, via the connecting cable 71.

The connecting cables 70 connect between the conductive elements 30 and the switch 60. The connecting cables 70 include current supply cables, which are not illustrated, and which are provided to supply current to the conductive elements 30, and data transmission cables, which are not illustrated, and which are provided to send out data from the conductive elements 30 to the reading device.

The connecting cable 71 connects between the switch 60 and the reading device. The connecting cable 71 includes current supply cables, which are not illustrated, and which are provided to supply current to the conductive elements 30, and data transmission cables, which are not illustrated, and which are provided to send out data from the conductive elements 30 to the reading device.

<Configuration of Conductive Elements>

Now, the configuration of the conductive elements 30 according to the embodiment of the present invention will be described below in detail with reference to FIG. 3 and FIG. 4.

The conductive elements 30a, 30b, 30c and 30d all have the same configuration. The conductive elements 30a, 30b, 30c and 30d are formed with first elements 31 of a linear shape and second elements 32 of a linear shape.

Figure 3:
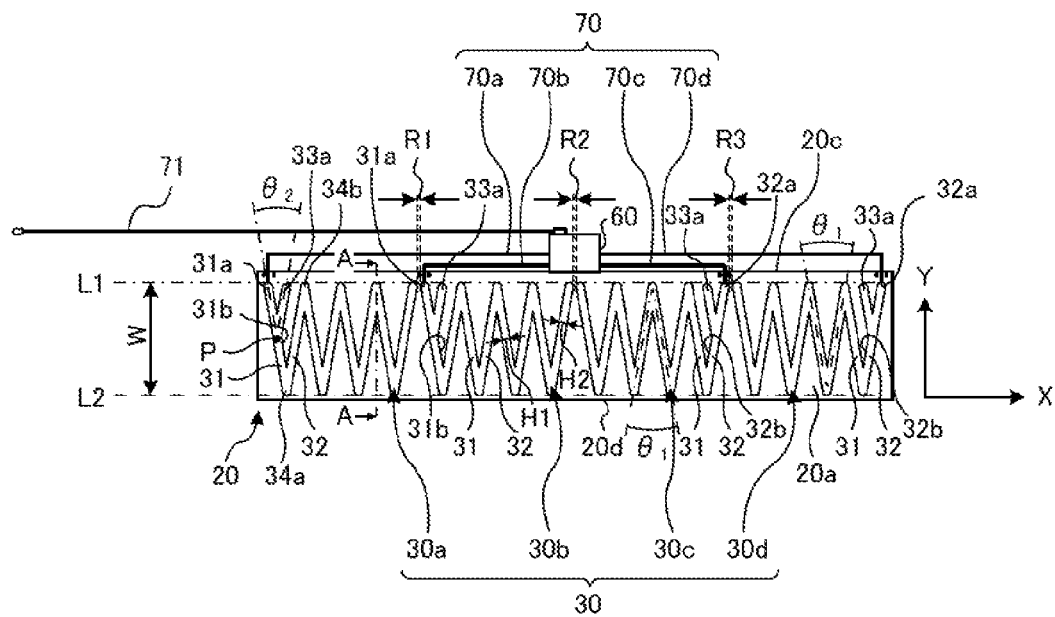
FIG. 3 is a plan view of a state where the cover is removed from the read sensor according to the first embodiment of the present invention.

The conductive elements 30a, 30b, 30c and 30d are formed by connecting the first elements 31 and the second elements 32 such that the angle $\theta 1$ formed between a first element 31 and a second element 32 becomes a predetermined sharp angle (see FIG. 3). The angle $\theta 1$ formed between a first element 31 and a second element 32 is, for example, 19° in FIG. 3. Note that the angle to be formed between a first element 31 and a second element 32 can be set in a range greater than 8° and equal to or less than 20°. The reason will be described later. Also, in the conductive elements 30a, 30b, 30c and 30d, the angle $\theta 1$ formed between a first element 31 and a second element 32 may be the same in all of the conductive elements, or may be different in part or in all of the conductive elements.

The conductive elements 30a, 30b, 30c and 30d are formed by connecting the first elements 31 and the second elements 32 with each other along the first plane 20a as if drawn unicursally in one stroke. In the conductive elements 30a, 30b, 30c and 30d, on the X-Y plane, several first element 31 are arranged parallel to each other, and also several second elements 32 are arranged parallel to each other. The conductive elements 30a, 30b, 30c and 30d are formed with four first elements 31 and four second elements 32. Note that the number of the first elements 31 and the second elements 32 may be any number as long as it is equal to or greater than 2 and equal to or less than 4. The reason will be described later.

In the conductive elements 30a, 30b, 30c and 30d, connecting parts 34a where the first elements 31 and the second elements 32 are connected are formed to be protrusions in the negative direction along the Y axis. Also, in the conductive elements 30a, 30b, 30c and 30d, connecting parts 34b where the first elements 31 and the second elements 32 are connected are formed to be protrusions in the positive direction along the Y axis. The connecting parts 34a have a shape in which the tip in the negative direction on the Y axis is bent on the X-Y plane. The connecting parts 34b have a shape in which the tip in the positive direction on the Y axis is bent on the X-Y plane.

As shown in FIG. 3, the width H1 of the first elements 31 on the X-Y plane and the width H2 of the second elements 32 on the X-Y plane are the same. The first elements 31 have the same width H1 along the long direction. The second elements 32 have the same width H2 along the long direction. The edge parts 31a of the first elements 31 in the long direction, not connected with the second elements 32, have a shape in which the tip is bent on the X-Y plane. The edge parts 32a of the second elements 32 in the long direction, not connected with the first elements 31, have a shape in which the tip is bent on the X-Y plane.

The edge parts 31a of the first elements 31 and the edge parts 32a of the second elements 32 are current supply parts that connect with the switch 60 and receive a supply of current from the switch 60. Consequently, the conductive elements 30a and 30b form a magnetic field and an electric field as the current supplied to the edge parts 31a of the first elements 31 runs from the edge parts 31a, through the conductive elements 30a and 30b, following the zigzag shape. Also, the conductive elements 30c and 30d form a magnetic field and an electric field as the current supplied to the edge parts 32a of the second elements 32 runs from the edge parts 32a, through the conductive elements 30c and 30d, following the zigzag shape.

In the conductive elements 30a and 30b, perturbation elements 33a to be connected near the edge parts 31a of the first elements 31 are provided. In the conductive elements 30c and 30d, perturbation elements 33a to be connected near the edge parts 32a of the second elements 32 are provided. The perturbation elements 33a are connected near the current supply parts of the conductive elements 30a, 30b, 30c and 30d, where current is supplied. Here, "near the current supply parts" means being closer to the current supply parts than the center of the first elements 31 or the second elements 32 in the long direction where the perturbation elements 33a are connected.

The perturbation elements 33a are provided to extend straight, between the first elements 31 and the second elements 32, from side edge parts 31b of the first elements 31 or from side edge parts 32b of the second elements 32, as shown in FIG. 3. The length of the perturbation elements 33a in the long direction can be changed as appropriate, in accordance with the angle θ1 formed between a first element 31 and a second element 32, the angle θ2 formed between a first element 31 or a second element 32 and a perturbation element 33a, and the number of the first elements 31 and the second elements 32.

The angle θ2 formed between a perturbation element 33a and a first element 31 is slightly bigger than the angle θ1 formed between a first element 31 and a second element 32 (θ2>θ1), but is approximately the same. The angle θ2 formed between a perturbation element 33a and a first element 31 is, for example, 20° in FIG. 3. By this means, as shown in FIG. 3, the perturbation elements 33a provided in the conductive elements 30a and 30b are provided to extend to go gradually near the second elements 32 opposing the first elements 31 where the perturbation elements 33a are connected, from the connecting parts with the first elements 31. Also, the perturbation elements 33a provided in the conductive elements 30c and 30d are provided to extend to go gradually near the first elements 31 opposing the second elements 32 where the perturbation elements 33a are connected, from the connecting parts with the second elements 32.

The perturbation elements 33a match the impedance in the connecting parts of the conductive elements 30a, 30b, 30c and 30d with the switch 60. By this means, the conductive elements 30a and 30b can make the edge parts 31a of the first elements 31 current supply parts, and likewise the conductive elements 30c and 30d can make the edge parts 32a of the second elements 32 current supply parts.

As shown in FIG. 3, the conductive element 30a is arranged in an edge part in the negative direction along the X axis, in the X-axis direction. The conductive element 30b is arranged between the conductive element 30a and the conductive element 30c along the X-axis direction. The conductive element 30c is arranged between the conductive element 30b and the conductive element 30d along the X-axis direction. The conductive element 30d is arranged in an edge part in the positive direction along the X axis, in the X-axis direction.

The conductive element 30a and the conductive element 30b are provided on the first plane 20a over a predetermined interval R1. The conductive element 30b and the conductive element 30c are provided on the first plane 20a over a predetermined interval R2. The conductive element 30c and the conductive element 30d are provided on the first plane 20a over a predetermined interval R3. The interval R1, the interval R2 and the interval R3 may all be the same (R1=R2=R3), or may be partly different or all different. The interval R1 is set to such an interval that data can be acquired with reliability from the radio tags located in the positive direction along the Z axis between the conductive element 30a and the conductive element 30b. The interval R2 is set to such an interval that data can be acquired with reliability from the radio tags located in the positive direction along the Z axis between the conductive element 30b and the conductive element 30c. The interval R3 is set to such an interval that data can be acquired with reliability from the radio tags located in the positive direction along the Z axis between the conductive element 30c and the conductive element 30d.

The conductive elements 30a, 30b, 30c and 30d are provided within a range of the width W in the Y-axis direction, as shown in FIG. 3.

The conductive elements 30a, 30b, 30c and 30d are provided on the dielectric plate 20 so that a straight line L1 to connect between the connecting parts 34b that neighbor each other along the X-axis direction becomes parallel to two sides 20c and 20d of the dielectric plate 20 that oppose each other along the Y-axis direction. Also, the conductive elements 30a, 30b, 30c and 30d are provided on the dielectric plate 20 so that a straight line L2 to connect between the connecting parts 34b that neighbor each other along the X-axis direction becomes parallel to two sides 20c and 20d of the dielectric plate 20 that oppose each other along the Y-axis direction. The interval between the straight line L1 and the straight line L2 is equal to the width W.

By making the interval R4 between the straight line L1 and the side 20c of the dielectric plate 20 (see FIG. 4) shorter, it is possible to widen the range in the positive direction on the Y axis in which data can be acquired from the radio tags, within the range of the length of the dielectric plate 20 in the Y-axis direction. On the other hand, when the interval R4 is made shorter, the strength of the dielectric plate 20 between the conductive elements 30 and the side 20c decreases. Also, by making the interval R5 between the straight line L2 and the side 20d of the dielectric plate 20 shorter, it is possible to widen the range in the negative direction on the Y axis in which data can be acquired from the radio tags, within the range of the length of the dielectric plate 20 in the Y-axis direction. On the other hand, when the interval R5 is made shorter, the strength of the dielectric plate 20 between the conductive elements 30a, 30b, 30c and 30d and the side 20d decreases. Consequently, the interval R4 and the interval R5 are set to such distances that both the range in which data can be acquired and the strength of the dielectric plate 20 can be secured. The interval R4 and the interval R5 may be the same (R4=R5) or may be different. In the cases illustrated in FIG. 3 and FIG. 4, the interval R4 and the interval R5 are different.

The conductive elements 30a, 30b, 30c and 30d are each connected to the switch 60, as shown in FIG. 3. The conductive element 30a is connected to the switch 60 by means of a connecting cable 70a. The conductive element 30b is connected to the switch 60 by means of a connecting cable 70b. The conductive element 30c is connected to the switch 60 by means of a connecting cable 70c. The conductive element 30d is connected to the switch 60 by means of a connecting cable 70d.

The conductive elements 30a and 30b, arranged on the left-half side of the dielectric plate 20 along the X-axis direction, are supplied with power from the first elements 31, and the conductive elements 30c and 30d, arranged on the right-half side of the dielectric plate 20 along the X-axis direction, are supplied with power from the second elements 32. To be more specific, the conductive elements 30a and 30b are supplied with power from the edge parts 31*a* of the first elements 31. The conductive elements 30*c* and 30*d* are supplied with power form the edge parts 32*a* of the second elements 32. In addition to this, the switch 60 is arranged approximately in the center of the dielectric plate 20 along the X-axis direction. By this means, the connecting cables 70*a*, 70*b*, 70*c* and 70*d* can be wired separately between the right and the left over the switch 60 along X-axis direction, so that the connecting cables 70*a*, 70*b*, 70*c* and 70*d* can connect the switch 60 and each of the conductive elements 30*a*, 30*b*, 30*c* and 30*d*, without tangling up with each other.

The switch 60 switches between the conductive elements 30*a*, 30*b*, 30*c* and 30*d* and supply current to each, one after another. The switch 60 switches between the conductive elements 30*a*, 30*b*, 30*c* and 30*d*, and acquires the data from the radio tags, acquired in the conductive elements 30*a*, 30*b*, 30*c* and 30*d*, from the conductive elements 30*a*, 30*b*, 30*c* and 30*d*, one after another, and outputs the acquired data to the reading device.

Here, the amount of current to be supplied to the read sensor 10 when communicating with the radio tags is limited to or below a predetermined value, to prevent interference against other devices. With the present embodiment, the conductive elements 30*a*, 30*b*, 30*c* and 30*d* are divided in four and provided on the dielectric plate 20, and are switched around by means of the switch 60 and supplied with power one after another, so that, compared to the case where the conductive elements 30*a*, 30*b*, 30*c* and 30*d* are coupled and provided as one continuous conductive element on the dielectric plate 20, it is possible to make the amount of current to be supplied to the conductive elements 30*a*, 30*b*, 30*c* and 30*d* relatively large. By this means, the conductive elements 30*a*, 30*b*, 30*c* and 30*d* can increase the intensity of a magnetic field or an electric field, so that data can be acquired from the radio tags with reliability.

<Modified Example of Conductive Elements>

A modified example of the conductive elements 30 according to the embodiment of the present invention will be described below in detail with reference to FIG. 5. In comparison with FIG. 3, in FIG. 5, the angle θ1 formed between a first element 31 and a second element 32 and the angle θ2 formed between a first element 31 and a perturbation element 33*b* are made different.

Figure 5:
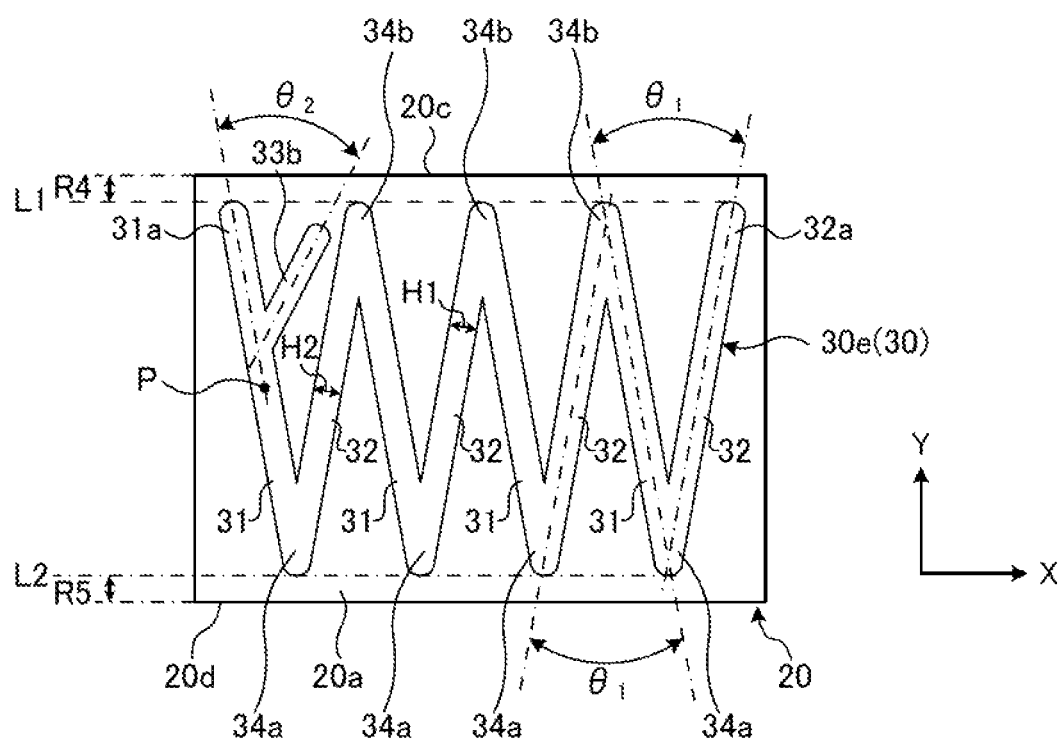
FIG. 5 is a plan view of a state where part of the cover is removed from a read sensor according to a modified example of an embodiment of the present invention.

As shown in FIG. 5, in the conductive element 30*e*, the angle θ1 formed between a first element 31 and a second element 32 is, for example, 20°, and the angle θ2 formed between a first element 31 and a perturbation element 33*b* is, for example, 38°.

In this way, with the conductive elements 30, it is possible to change as appropriate the angle θ2 that is formed between a first element 31 and a perturbation element 33*b*, in accordance with the angle θ1 that is formed between a first element 31 and a second element 32, the number of the first elements 31 and the second elements 32, the width W and so on.

Note that configuration of the conductive elements 30*e* apart from the above is the same as the conductive elements 30*a* and 30*b*, so that their descriptions will be omitted.

<Method of Manufacturing Read Sensor>

A method of manufacturing the read sensor 10 according to the embodiment of the present invention will be described below in detail.

First, copper foil is applied to the front surface of a platelike member, which is made of polyethylene terephthalate, by means of an adhesive.

Next, the copper foil applied to the platelike member is peeled from the platelike member, except for the parts to serve as the conductive elements 30 (zigzag-shaped parts).

By this means, the platelike member serves as the dielectric plate 20, and the remaining copper-foiled parts serve as the conductive elements 30.

Then, a metal plate 40 is attached to the second plane 20*b* of the dielectric plate 20, where no conductive element 30 is provided.

Furthermore, by connecting the edge parts 31*a* of the first elements 31 and the edge parts 32*a* of the second elements 32 in the conductive elements 30 with the switch 60 that is prepared in advance, using the connecting cables 70*a*, 70*b*, 70*c* and 70*d*, the read sensor 10 is complete.

Note that the above manufacturing method is by no means limiting, and it is equally possible to form a platelike member made of polyethylene terephthalate, and copper foil, as one, and remove the copper foil, except for the parts to serve as the conductive elements 30, by means of etching. Also, it is equally possible form the conductive elements 30 by blanking a copper plate, and apply the conductive elements 30 onto the dielectric plate 20 made of polyethylene terephthalate.

<Magnetic Field Formed by Conductive Elements>

The magnetic field that is formed by the conductive elements according to the embodiment of the present invention will be described below in detail with reference to FIG. 6 and FIG. 7.

Figure 6:
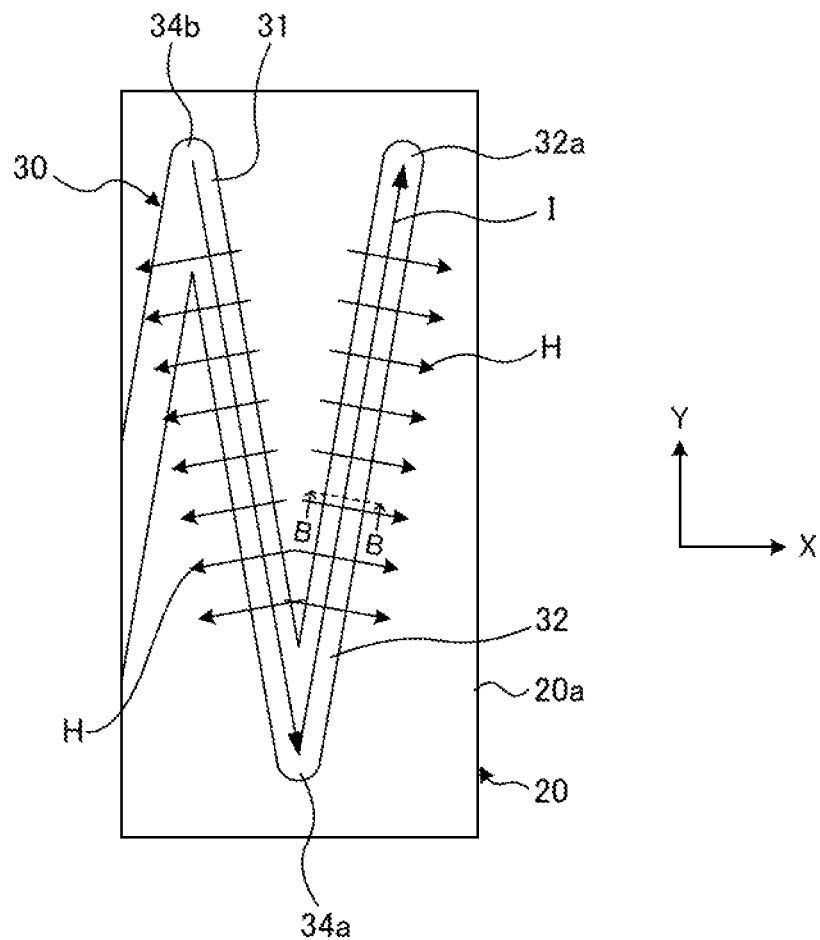
FIG. 6 is a diagram to show the orientations of current and magnetic field in a conductive element according to an embodiment of the present invention.
Figure 7:
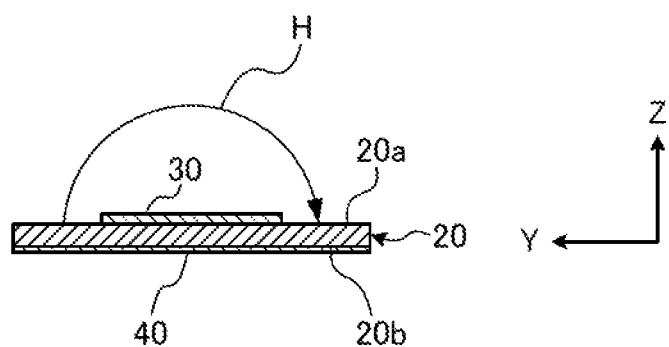
FIG. 7 is a B-B cross-sectional view of FIG. 6.

As shown in FIG. 6, when current is supplied via the switch 60, current I runs along a conductive element 30, so that the conductive element 30 forms a magnetic field H that crosses the conductive element 30 horizontally, seen from the positive side on the Z axis. Also, as shown FIG. 7, the conductive element 30 forms a semicircular magnetic field H around the conductive element 30, on the Y-Z plane.

By this means, the conductive element 30 can acquire data, using a magnetic field, from the radio tags inside the magnetic field H.

<Radiation Characteristics when the Number of First Elements and Second Elements is Changed>

The radiation characteristics when the number of the first elements and the second elements according to the embodiment of the present invention is changed will be described in detail with reference to FIG. 8A to FIG. 10B. In FIG. 9A to FIG. 10B, measurements are conducted by making the frequency to use 920 MHz.

Figure 9A:
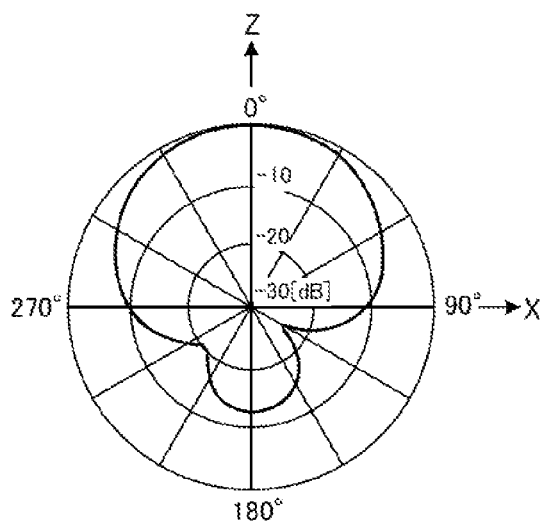
FIG. 9A provides diagrams to show the radiation characteristics on an X-Z plane when the number of first elements and the number of second elements according to an embodiment of the present invention are made different.
Figure 9B:
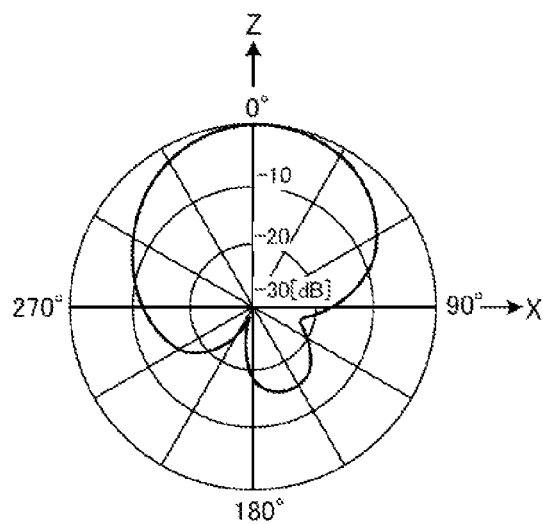
FIG. 9B provides diagrams to show the radiation characteristics on an X-Z plane when the number of first elements and the number of second elements according to an embodiment of the present invention are made different.
Figure 9C:
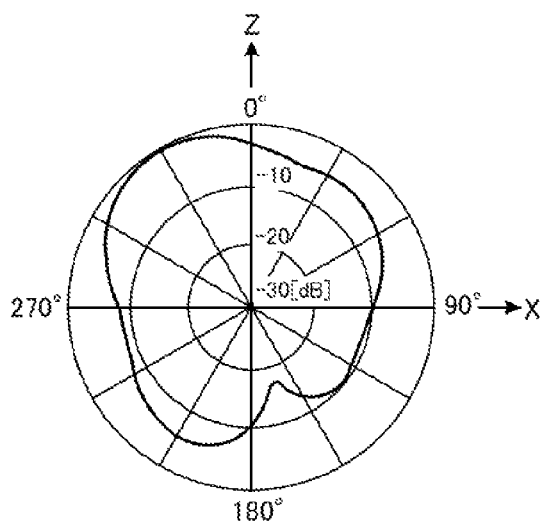
FIG. 9C provides diagrams to show the radiation characteristics on an X-Z plane when the number of first elements and the number of second elements according to an embodiment of the present invention are made different.
Figure 9D:
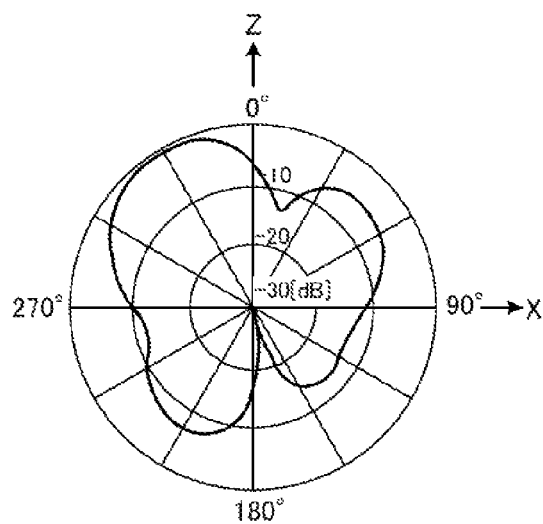
FIG. 9D provides diagrams to show the radiation characteristics on an X-Z plane when the number of first elements and the number of second elements according to an embodiment of the present invention are made different.
Figure 10A:
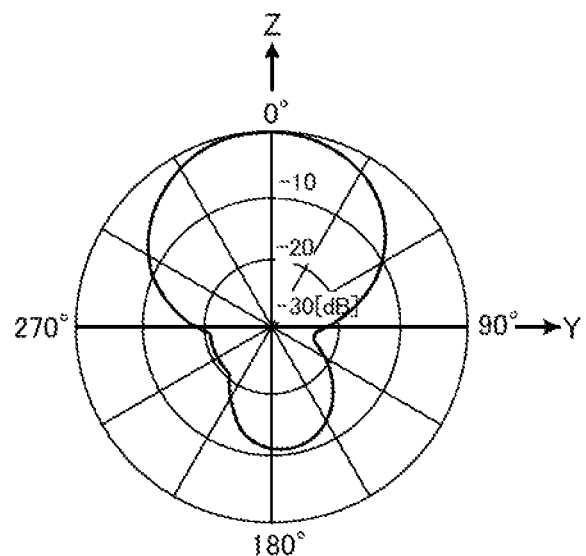
FIG. 10A provides diagram to show the radiation patterns on a Y-Z plane when the number of first elements and the number of second elements according to an embodiment of the present invention are made different.
Figure 10B:
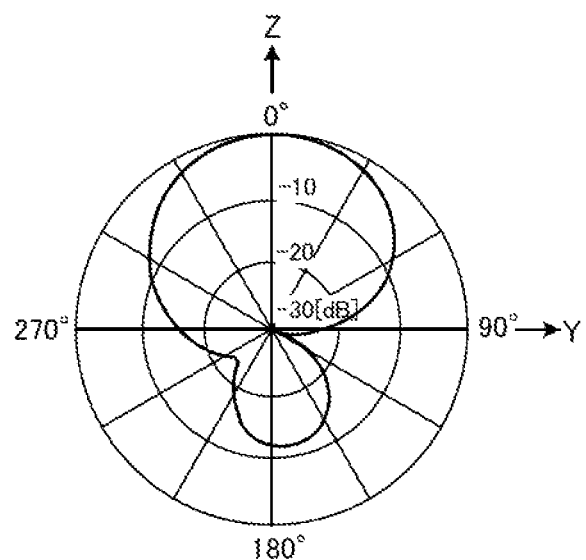
FIG. 10B provides diagram to show the radiation patterns on a Y-Z plane when the number of first elements and the number of second elements according to an embodiment of the present invention are made different.

In FIG. 9A and FIG. 10B, the radiation characteristics of electric waves are measured in order to acquire data from the radio tags by means of an electric field. Here, the conductive elements 30 need to radiate electric waves having a directivity pointed to the radio tags of the target to acquire data from, and meanwhile also need to radiate electric waves having such a directivity that wrong data is not acquired from radio tags apart from the radio tags of the target to acquire data from. To be more specific, the conductive elements 30 have a directivity to widen the radiation range of electric waves radiated in the X-Z plane and also narrow the radiation range of electric waves radiated in the Y-Z plane. Consequently, the directivity of electric waves radiated from the conductive elements 30 is measured as shown in FIG. 9A to FIG. 10B so as to fulfill the above conditions regarding directivity.

In FIG. 9A to FIG. 10B, since measurements are conducted in the state in which the metal plate 40 is provided, the range of radiation of electric waves radiated along the negative direction on the Z axis is quite narrow and also the intensity of radiation is low. Note that, although, in FIG. 9A to FIG. 10B, some electric waves are radiated along the negative direction on the Z axis, when placing the read sensor 10, a shelf that is made of metal may be arrange on the negative side of the conductive elements 30 along the Z axis, so that it is possible to block the electric waves radiated in the negative direction on the Z axis.

Figure 8A:
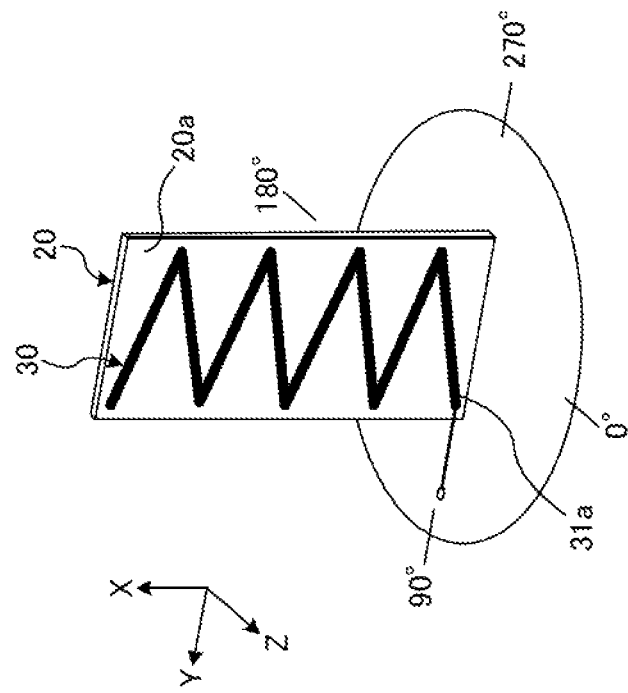
FIG. 8A provides diagrams to show the orientations of a dielectric plate provided with conductive elements according to an embodiment of the present invention, upon measurement of radiation characteristics.

First, the radiation characteristics of the conductive elements 30 in the X-axis direction and the Z-axis direction when, in the state shown in FIG. 8A, the dielectric plate 20 is arranged parallel to the X-Y plane, will be described with reference to FIG. 9A, FIG. 9B, FIG. 9C and FIG. 9D. Note that, in FIG. 9A, FIG. 9B, FIG. 9C and FIG. 9D, the circumferential direction shows the angle (°) of radiated waves, and the radial direction shows the relative value (dB) in each angle assuming 0 dB as the maximum value. Also, in the radiation characteristics shown in FIG. 9A, FIG. 9B, FIG. 9C and FIG. 9D, the intensity at a point in the first element 31 connected with the switch 60, that intersects with a straight line which is parallel to the sides 20c and 20d and which is at equal distance from the straight line L1 and the straight line L2 (see FIG. 5) is the center.

FIG. 9A shows the radiation characteristics when a conductive element 30-1, having two first elements 31 and two second elements 32, is formed by connecting the first elements 31 and the second elements 32 with each other as if drawn unicursally in one stroke, so that the angle to be formed between a first element 31 and a second element 32 becomes 20°.

FIG. 9B shows the radiation characteristics when a conductive element 30-2, having three first elements 31 and three second elements 32, is formed by connecting the first elements 31 and the second elements 32 with each other as if drawn unicursally in one stroke, so that the angle to be formed between a first element 31 and a second element 32 becomes 20°.

FIG. 9C shows the radiation characteristics when a conductive element 30-3, having four first elements 31 and four second elements 32, is formed by connecting the first elements 31 and the second elements 32 with each other as if drawn unicursally in one stroke, so that the angle to be formed between a first element 31 and a second element 32 becomes 20°. That is to say, FIG. 9C shows the radiation characteristics of the conductive element 30 shown in FIG. 5.

FIG. 9D shows the radiation characteristics when a conductive element 30-3, having five first elements 31 and five second elements 32, is formed by connecting the first elements 31 and the second elements 32 with each other as if drawn unicursally in one stroke, so that the angle to be formed between a first element 31 and a second element 32 becomes 20°.

In the radiation characteristics shown in FIG. 9A, the intensity in the positive direction along the Z axis on the Z axis is maximum (0 dB), and also the intensity in the positive direction along the X axis on the X axis is approximately 12 dB lower than the maximum value. In the radiation characteristics shown in FIG. 9B, the intensity in the positive direction along the Z axis on the Z axis is maximum, and also the intensity in the positive direction along the X axis on the X axis is approximately 17 dB lower than the maximum value. Consequently, in the cases illustrated in FIG. 9A and FIG. 9B, it is possible to acquire data from the radio tags that are present in the positive direction of points P in the conductive elements 30-1 and 30-2 along the Z axis (hereinafter referred to as "the vertical upward direction of points P") and near the vertical upward direction of points P, and, furthermore, it is possible to generally widen the range in which data can be acquired from the radio tags that are present in the X axis direction, among the radio tags that are present in the positive direction of the conductive elements 30-1 and 30-2 along the Z axis (hereinafter referred to as "the vertical upward direction of the conductive elements").

In the radiation characteristics shown in FIG. 9C, compared to the radiation characteristics of FIG. 9A and FIG. 9B, the intensity in the positive direction along the Z axis on the Z axis is approximately 3 dB lower. Also, in the radiation characteristics of FIG. 9C, in comparison with the radiation characteristics of FIG. 9A, the intensity in the positive direction along the X axis on the X axis is approximately 3 dB higher, and, in comparison with the radiation characteristics of FIG. 9B, the intensity in the positive direction along the X axis on the X axis is approximately 8 dB higher. Consequently, in the case illustrated in FIG. 9C, compared to the cases of FIG. 9A and FIG. 9B, it is difficult to acquire data from the radio tags located in the vertical upward direction of the conductive element 30-3, while it is possible to widen the range in which data can be acquired from radio tags in the X-axis direction, among the radio tags that are present in the vertical upward direction of the conductive elements 30-3.

In the radiation characteristics of FIG. 9D, compared to the radiation characteristics of FIG. 9C, the intensity in the positive direction along the Z axis on the Z axis is approximately 3 dB lower, and the intensity in the positive direction along the X axis on the X axis is approximately 3 dB lower. Also, in the radiation characteristics of FIG. 9D, the intensity of radiated waves becomes suddenly lower when the angle of radiated waves is approximately 15°. Consequently, in the case illustrated in FIG. 9D, compared to the case of FIG. 9C, it becomes not possible to acquire data from part of the radio tags that are present near the vertical upward direction of point P in the conductive element 30-4, and, furthermore, it is possible to make the range in which data can be acquired from the radio tags located in the X-axis direction, among the radio tags that are present in the vertical upward direction of the conductive element 30-4, approximately the same width.

Note that, in the event of a conductive element that is formed by making the number of the first elements 31 one and the number of the second elements 32 one, and that is formed such that the angle to be formed between the first element 31 and the second element 32 becomes 20°, although not illustrated, impedance matching is not possible, and it is furthermore confirmed that no read sensor function is provided.

From what has been described above, it is clear that there is a general likelihood that, as the number of the first elements 31 and the second elements 32 increases, the range in which data can be acquired from the radio tags located in the X-axis direction of the conductive elements widens, while the range in which data can be acquired from the radio tags located in the vertical upward direction of the conductive elements narrows. Consequently, it is preferable to set the number of the first elements 31 and the second elements 32 equal to or greater than 2 and equal to or less than 4, which provides functions as a read sensor and which provides a range in which data can be acquired from the radio tags located in the vertical upward direction of the conductive elements.

Figure 8B:
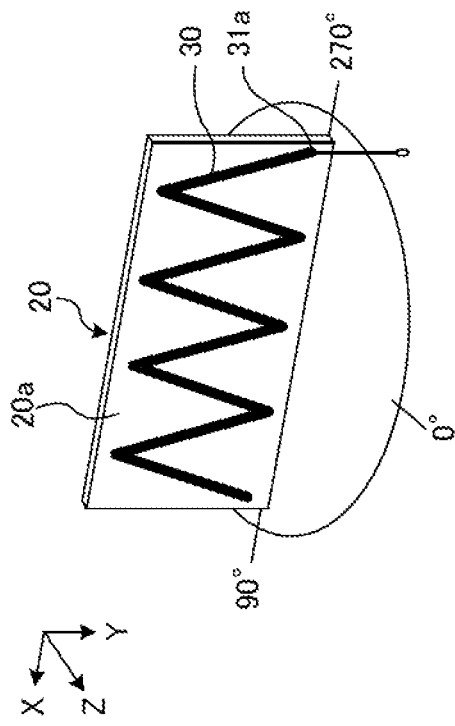
FIG. 8B provides diagrams to show the orientations of a dielectric plate provided with conductive elements according to an embodiment of the present invention, upon measurement of radiation characteristics.

Next, the radiation characteristics of the conductive elements 30 in the Y-axis direction and the Z-axis direction when the dielectric plate 20 is arranged parallel to the X-Y plane in the state illustrated in FIG. 8B will be described below in detail with reference to FIG. 10A and FIG. 10B. Note that, in FIG. 10A and FIG. 10B, the circumferential direction shows the angle (°) of radiated waves, the radial direction shows the relative value (dB) in each angle assuming 0 dB as the maximum value. In the radiation characteristics shown in FIG. 10A and FIG. 10B, the intensity at point P (see FIG. 5) is the center.

FIG. 10A shows the radiation characteristics when the conductive element 30-1, having two first elements 31 and two second elements 32, is formed by connecting the first elements 31 and the second elements 32 with each other as if drawn unicursally in one stroke, so that the angle to be formed between a first element 31 and a second element 32 becomes 20°.

FIG. 10B shows the radiation characteristics when the conductive element 30-3, having four first elements 31 and four second elements 32, is formed by connecting the first elements 31 and the second elements 32 with each other as if drawn unicursally in one stroke, so that the angle to be formed between a first element 31 and a second element 32 becomes 20°.

In the radiation characteristics of FIG. 10A and FIG. 10B, the intensity in the positive direction along the Z axis on the Z axis is maximum (0 dB), and the intensity in the positive direction along the X axis on the X axis is approximately 23 dB lower than the maximum value. A comparison of FIG. 9A to FIG. 10B makes it clear that the intensity on the Y axis is significantly lower than the intensity on the X axis. Consequently, it is possible to make the range in which data can be acquired from the radio tags along the Y-axis direction of the conductive elements 30-1 and 30-3 narrow, compared to the range in which data can be acquired from the radio tags along the X-axis direction of the conductive elements 30-1, 30-2, 30-3 and 30-4, regardless of the number of the first elements 31 and the second elements 32.

<Range in which Data can be Acquired when the Angle Formed Between a First Element and a Second Element is Changed>

The range in which data can be acquired when the angle θ1 to be formed between a first element and a second element according to the embodiment of the present invention will be described below in detail with reference to FIG. 11 and FIG. 12.

The characteristics when the angle θ1 to be formed between a first element and a second element is changed are measured by making the frequency to use 920 MHz. The characteristics when the angle θ1 to be formed between a first element and a second element are measured in order to acquire data from the radio tags by means of an electric field. Note that the conditions required for the directivity of electric waves radiated from the conductive elements 30 are the same as those that have been described with reference to FIG. 8A to FIG. 10B.

In the event of a conductive element 30-5 where the angle θ1 formed between a first element 31 and a second element 32 is 20 degrees, although it is difficult to acquire data from the radio tags that are present in edge parts in the X axis direction, among the radio tags that are present in the vertical upward direction of the conductive element 30-5, it is still possible to acquire data from nearly all of the radio tags that are present in the vertical upward direction of the conductive element 30-5.

In the event of a conductive element 30-6 where the angle θ1 formed between a first element 31 and a second element 32 is 25 degrees, it is not possible to acquire data from the radio tags that are present in edge parts in the positive direction on the X axis, among the radio tags that are present in the vertical upward direction of the conductive element 30-6.

In the event of a conductive element 30-7 where the angle θ1 formed between a first element 31 and a second element 32 is 30 degrees, among the radio tags that are present in the vertical upward direction of the conductive element 30-7, there are some radio tags from which data cannot be acquired, even among the radio tags that are present in the vertical upward direction of point P and near the vertical upward direction of point P.

Figure 11:
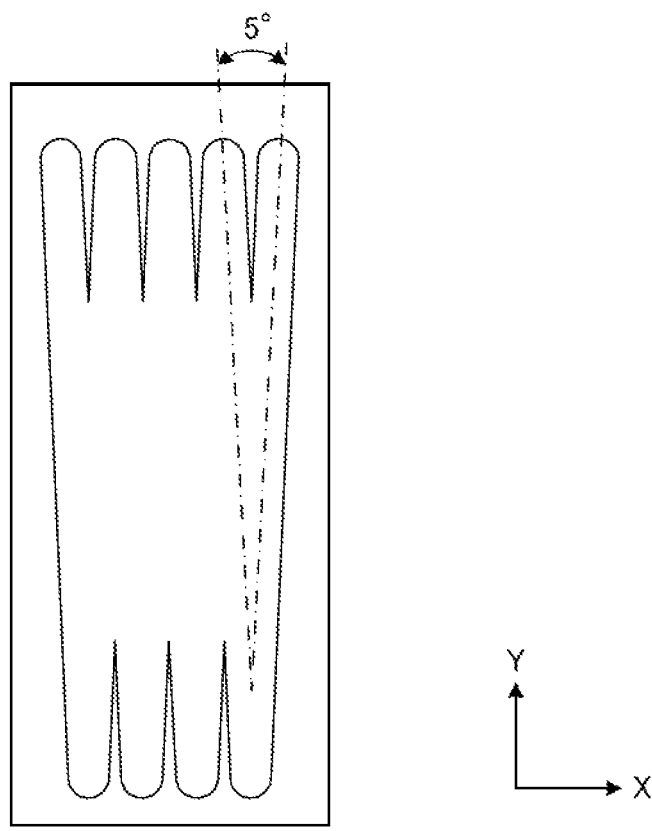
FIG. 11 is a plan view of the dielectric plate when the angle formed between a first element and a second element is made 5 degrees.
Figure 12:
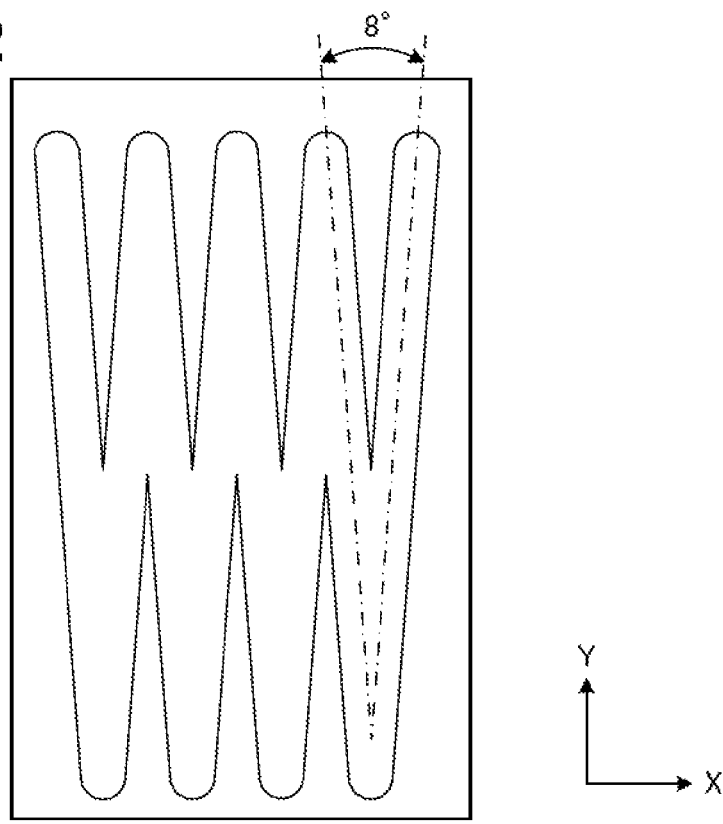
FIG. 12 is a plan view of the dielectric plate when the angle formed between a first element and a second element is made 8 degrees.

Note that, when the angle formed between a first element 31 and a second element 32 is 5 degrees as shown in FIG. 11, and when the angle formed between a first element 31 and a second element 32 is 8 degrees as shown in FIG. 12, the interval between the first element 31 and the second element 32 is too narrow, and therefore impedance matching is not possible, and no read sensor function is provided.

From what has been described above, it is found that, as the angle θ1 formed between a first element 31 and a second element 32 is increased, the number of radio tags from which data can be acquired decreases. When the angle θ1 formed between a first element 31 and a second element 32 is made 20°, it becomes difficult to acquire data from the radio tags located in edge parts of the conductive element 30-5 along the X-axis direction, and it follows that, when the angle θ1 to form between a first element 31 and a second element 32 is made bigger than 20°, there are radio tags from which data cannot be acquired. Meanwhile, it is also found that, if the angle to form between a first element 31 and a second element 32 is made 8° or less, no sensor function is provided. Consequently, it is preferable to make the angle θ1 to be formed between a first element 31 and a second element 32 greater than 8 degrees and equal to or less than 20 degrees, which provides functions as a read sensor, and which provides a range in which data can be acquired from the radio tags that are present in the vertical upward direction of the conductive elements.

<Configuration of the Management System>

Figure 13:
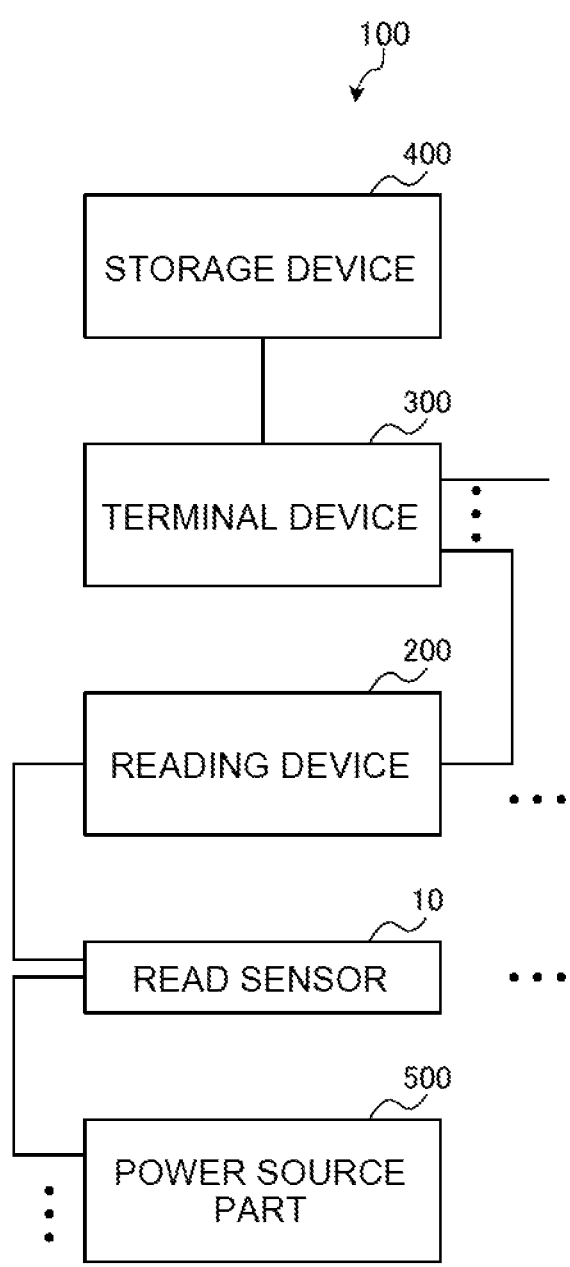
FIG. 13 is a block diagram of a management system according to an embodiment of the present invention.

A configuration of a management system 100 according to the embodiment of the present invention will be described below in detail with reference to FIG. 13 to FIG. 15. Note that an example case will be described here with the present embodiment where the management system 100 is used to manage books in a library and/or the like.

The management system 100 has a read sensor 10, a reading device 200, a terminal device 300, a storage device 400, and a power source part 500. Note that the configuration of the read sensor 10 has been described above and will not be described here.

The reading device 200 reads the data from the radio tags acquired in the read sensor 10, and outputs the data to the terminal device 300.

The terminal device 300 manages the information of the radio tags read by the reading device 200, and stores the management result in the storage device 400. The terminal device 300 is, for example, a stationary personal computer, a portable, notebook-type personal computer, a tablet terminal, a smart phone and so on.

The power source part 500 supplies power to the read sensor 10.

A bookshelf 600 stores books 700a, 700b, 700c, 700d and 700e, and also has multi-rack storage shelves 601a, 601b, 601c, 601d and 601e for storing the books 700a, 700b, 700c, 700d and 700e. In the bookshelf 600, reading devices 200 are provided in association with the storage shelves 601a, 601b, 601c, 601d and 601e.

A read sensor 10 is placed on each upper plane of the storage shelves 601a, 601b, 601c, 601d and 601e on the positive side along the Z axis. On the read sensors 10, the books 700a, 700b, 700c, 700d and 700e are placed upright.

Each book 700a stored in the storage shelf 601a is attached a radio tag 701a, in which information that is specific to each book 700 such as the title of the book 700a, the name of the author and so on is memorized. The read sensor 10 placed on the storage shelf 601a acquires data, from the radio tags 701a, in a non-contact manner, including dedicated information such as the IDs of the radio tags 701a and so on.

When the storage shelf 601a is made of metal, it is possible to block the magnetic field and the electric field from the conductive elements 30 of the read sensor 10 placed on the storage shelf 601a, which travel toward the negative direction along the Z axis. By this means, the storage shelf 601a can complement the blocking of the magnetic field and the electric field that travel toward the negative direction along the Z axis by the metal plate 40 of the read sensor 10. In this case, the metal plate 40 has its blocking function complemented by the storage shelf 601a, and therefore has only to cover part of the second plane 20b.

Note that the storage shelves 601b, 601c, 601d and 601e have the same configuration as that of the storage shelf 601a, and therefore their descriptions will be omitted.

<Operation of Management System>

The operations of the management system 100 according to the embodiment of the present invention will be described below in detail with reference to FIG. 1 to FIG. 5 and FIG. 13 to FIG. 15.

First, the power source part 500 supplies current to the conductive elements 30 of a read sensor 10 via the switch 60.

A plurality of conductive elements 30 of the read sensor 10 are switched around by means of the switch 60 and are supplied current one after another, and generate electromagnetic wave one after another.

The radio tags 701 are activated by the influence of the magnetic field or the electric field from the conductive elements 30, and transmit data including the information stored to the conductive elements 30.

Figure 14:
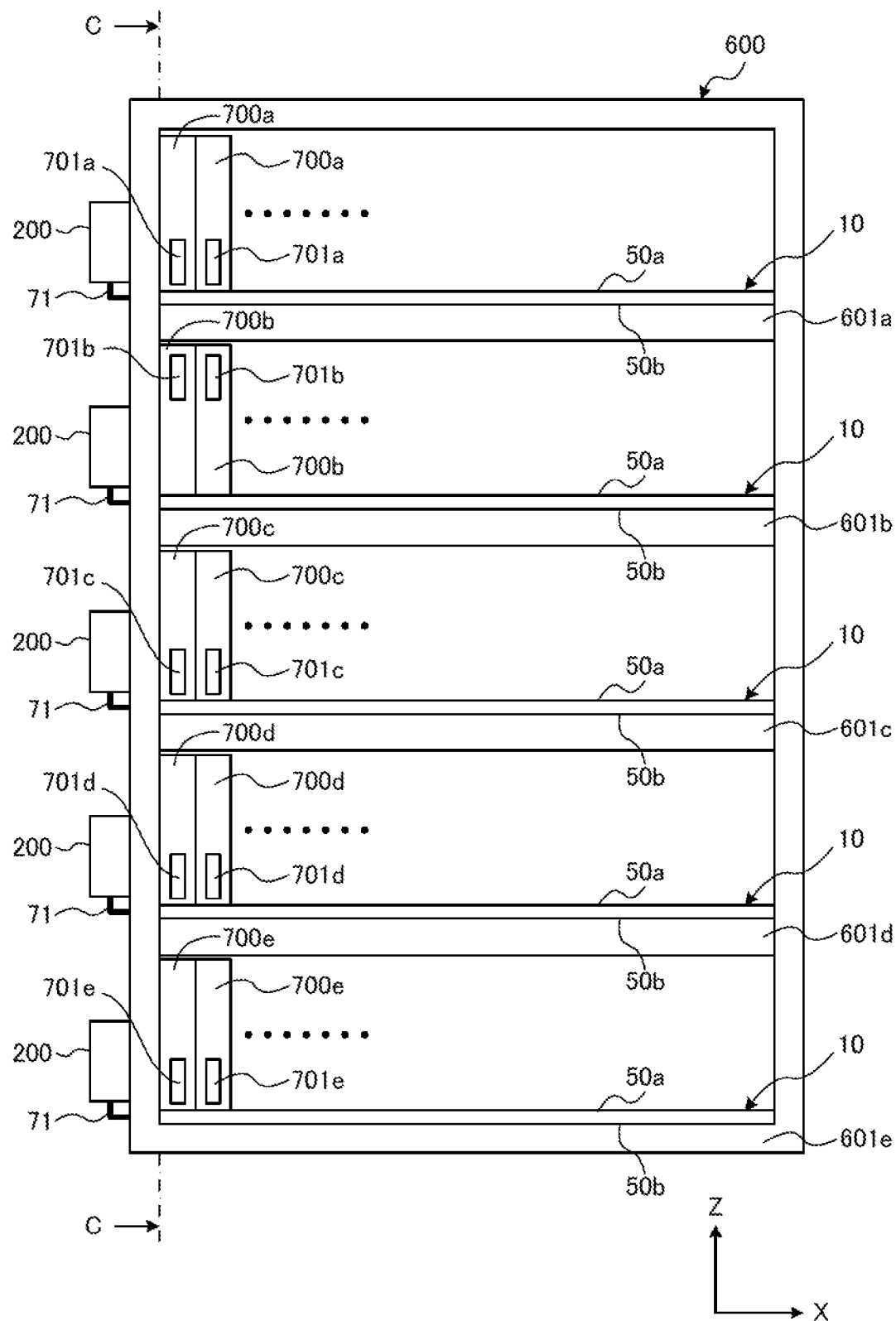
FIG. 14 is a rear view of a bookshelf used in a management system according to an embodiment of the present invention.

To be more specific, as shown in FIG. 14, the radio tags 701a attached to books 700a, the radio tags 701c attached to books 700c, the radio tags 701d attached to books 700d, and the radio tags 701e attached to books 700e are present in relatively close distance to the conductive elements 30 of the read sensor 10, and therefore are activate by the influence of the magnetic field from the conductive elements 30.

Meanwhile, as shown in FIG. 14, since books 700b are stored upside down in the storage shelf 601b, the radio tags 701b attached to the books 700b are present in relatively far distance with respect to the conductive elements 30 of the read sensor 10, and are therefore activated by the influence of the electric field from the conductive elements 30. In particular, when books 700b of large size such as encyclopedias are stored upside down, the distance between the radio tags 701b and the conductive elements 30 increases.

Consequently, the radio tags 701a, 701b, 701c, 701d and 701e are activated by the influence of at least one of the magnetic field and the electric field from the conductive elements 30, and, by this means, can pass data including the stored information, to the read sensors 10.

Figure 15:
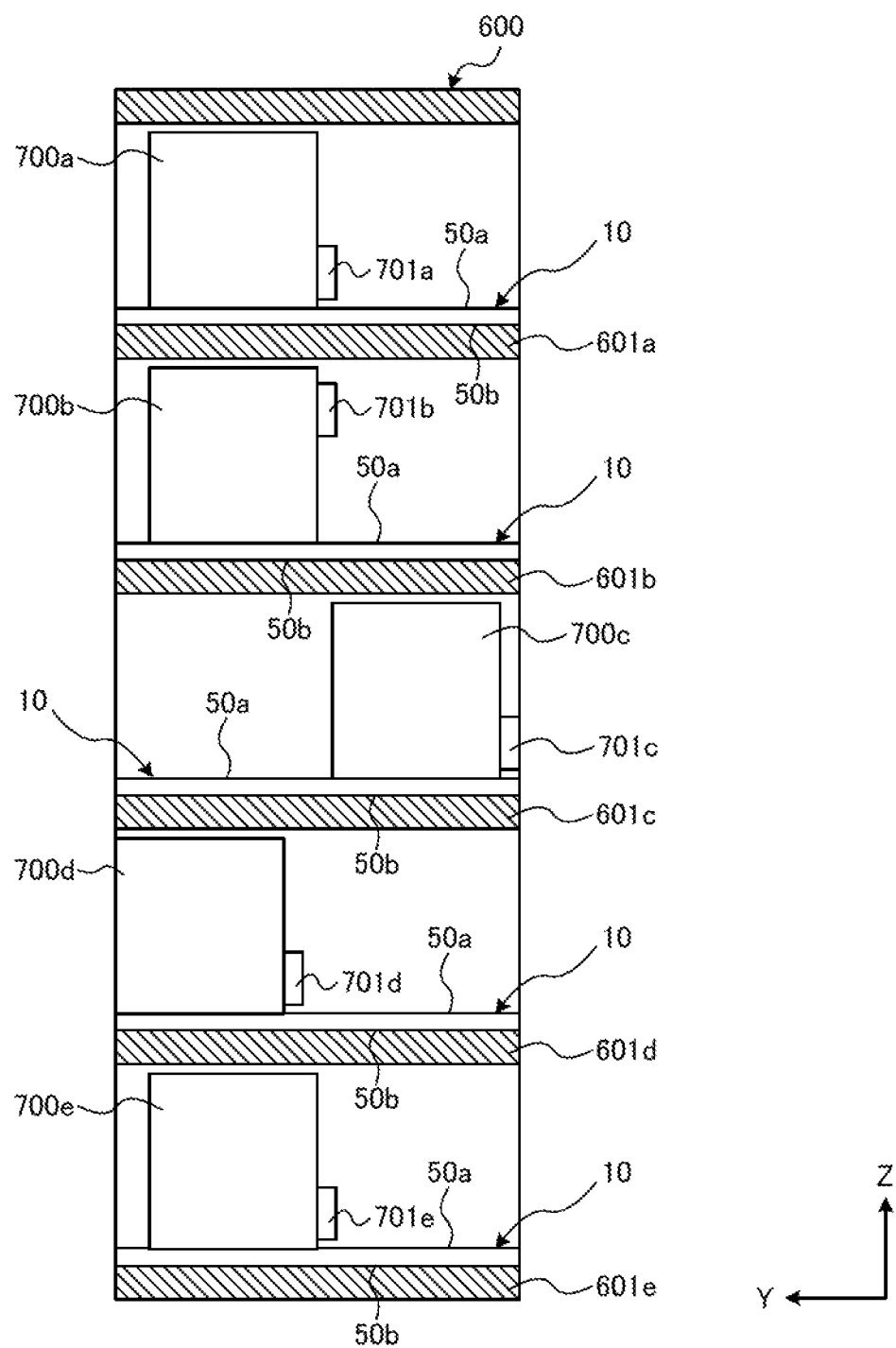
FIG. 15 is a C-C cross-sectional view of FIG. 14.

Also, as shown in FIG. 15, when the depth of the storage shelves 601a, 601b, 601c, 601d and 601e, which is the length in the Y-axis direction, is long, the positions where the books 700a, 700b, 700c, 700d and 700e are stored in the storage shelves 601a, 601b, 601c, 601d and 601e along the Y-axis direction vary. In this case, the positions of the radio tags 701a, 701b, 701c, 701d and 701e along the Y-axis direction also vary. Consequently, the length of the dielectric plates 20 of the read sensors 10 in the Y-axis direction preferably matches the depth of the storage shelves 601a, 601b, 601c, 601d and 601e. Also, it is preferable to make the width W (see FIG. 3) on the dielectric plates 20 where the conductive elements 30 are provided as close to the depth of the storage shelves 601a, 601b, 601c, 601d and 601e as possible.

By this means, even when the books 700a, 700b, 700c, 700d and 700e are stored in different positions along the Y-axis direction between the storage shelves 601a, 601b, 601c, 601d and 601e, the conductive elements 30a, 30b, 30c and 30d can reliably acquire data from the radio tags 701a, 701b, 701c, 701d and 701e attached to the books 700a, 700b, 700c, 700d and 700e. Also, by making the length of the read sensors 10 and the storage shelves 601a, 601b, 601c, 601d and 601e along the Y-axis direction approximately the same, even when the books 700a, 700b, 700c, 700d and 700e are stored in different positions along the Y-axis direction between the storage shelves 601a, 601b, 601c, 601d and 601e, the books 700a, 700b, 700c, 700d and 700e are always placed on the read sensors 10, and therefore can be stored on the bookshelf 600 stably and neatly.

Meanwhile, since the range in which data can be acquired along the Y-axis direction is made narrow as shown in FIG. 10A and FIG. 10B, the conductive elements 30 can make it possible to prevent acquiring wrong data from the radio tags 701a, 701b, 701c, 701d, and 701e attached to books 700a, 700b, 700c, 700d and 700e that are not stored in the bookshelf 600 as much possible. For example, when the user having taken books 700a, 700b, 700c, 700d and 700e from the bookshelf 600 passes closely by the bookshelf 600 or stops right in front of the bookshelf 600, the read sensors 10 can prevent the situation where the books 700a, 700b, 700c, 700d and 700e are mistaken for ones that are stored in the bookshelf 600 and wrong data is acquired.

The read sensors 10 output the data acquired from the radio tags 701 by means of the conductive elements 30 to the reading device 200 via the switch 60.

The reading device 200 reads the information included in the data from the radio tags 701, acquired from the read sensors 10, and outputs the information to the terminal device 300.

The terminal device 300 manages the information input from the reading device 200, and stores the management result in the storage device 400.

With the management system 100, by carrying out the above operations on a regular basis, it is possible to learn the borrowing status of the books 700, check for misplacement on the bookshelf 600 and organize the books.

According to the present embodiment, a conductive element 30 is formed with first elements 31 of a linear shape and second elements 32 of a linear shape, and has a shape in which the first elements 31 and the second elements 32 are connected with each other along the first plane 20a, as if drawn unicursally in one stroke, such that the angle θ1 formed between a first element 31 and a second element 32 becomes a predetermined sharp angle, so that it is possible to acquire data from the read object using both a magnetic field and an electric field, and therefore data can be acquired reliably with a simple configuration.

Also, according to the present embodiment, by additionally providing perturbation elements 33 that are provided to extend straight, between the first elements 31 and the second elements 32, from the side edge parts 31b and 32b of the first elements 31 or the second elements 32 having current supply parts where current is supplied, impedance matching is made possible, so that it is possible to communicate well with the radio tags.

Also, with the present embodiment, the conductive elements are supplied with current through the edge parts 31a of the first elements 31 in the long direction that are not connected with the second elements 32, or through the edge parts 32a of the second elements 32 in the long direction that are not connected with the first elements 31, so that it is possible to make the antenna length a desirable length without making the read sensor bigger.

Also, according to the present embodiment, the dielectric plate 20 has a rectangular shape on a plan view, and the conductive elements 30 have connecting parts 34a and 34b that connect between the first elements 31 and the second elements 32, and are provided on the first plane 20a so that the straight lines L1 and L2 to connect between neighboring connecting parts 34a and 34b become parallel to two opposing sides 20c and 20d of the dielectric plate, so that it is possible to make the long direction of the dielectric plate and the direction of radiation of electric waves from the conductive elements match.

Also, according to the present embodiment, the predetermined sharp angle θ1 is greater than 8°, and equal to or less than 20°, so that it is possible to provide a minimum necessary number of the first elements and the second elements, and acquire data reliably from the radio tags that are present above the conductive elements.

Also, according to the present embodiment, the number of the first elements 31 is equal to or greater than 2 and equal to or less than 4, the number of the second elements 32 is equal to or greater than 2 and equal to or less than 4 and is the same as the number of the first elements 31, so that it is possible to provide a minimum necessary number of the first elements and the second elements and acquire data reliably from the radio tags that are present above the conductive elements.

Also, according to the present embodiment, a plurality of conductive elements 30 are aligned on the first plane 20a at predetermined intervals, so that it is possible to acquire data reliably from the radio tags that are located over a wide range, without reducing the current supplied to the conductive elements.

Also, according to the present embodiment, by additionally providing a switch 60 that switches around the conductive elements 30 and supply current to one after another, even when a plurality of conductive elements are provided, it is still possible to acquire data with reliability, without interfering with each other, from the radio tags that are located over a wide range.

Also, according to the present embodiment, the dielectric plate 20 is made of expandable plastic, so that it is possible to cushion the impact that is produced when an article to which the read object is attached is placed, and also to achieve lighter weight, without making the radiation characteristics of the conductive elements lower.

Also, according to the present embodiment, the dielectric plate 20 has a rectangular shape on a plan view, and has its length in the short direction made to match the length of the depth of the shelf where the articles to which radio tags are attached are stored, so that it is possible to acquire data from the radio tags, with reliability, even when the storage conditions of the articles vary.

Also, according to the present embodiment, a read sensor 10, a reading device 200 that reads the information which the read sensor 10 acquires from the radio tags, and a terminal device 300 that manages the information which the reading device 200 reads are provided, so that it is possible acquire information from the radio tags reliably, and therefore accurate management is made possible.

Note that the present invention is by no means limited to the above-described embodiment regarding the types, arrangement and number of members, and it is certainly possible make various changes and modifications without departing from the scope of the invention, by, for example, replacing these components as appropriate with ones that have similar or the same working effects.

For example, although the read sensors are used herein to manage books in a library and/or the like, it is equally possible to apply the read sensors to any and all systems that acquire data from the read object in a non-contact manner, such as in the case of management of articles stored in warehouse, the entry-exit control of people and so on.

Also, although the read sensors herein acquire information stored in radio tags from the radio tags, it is equally possible to acquire information that is stored in any read object that is capable of non-contact communication, other than radio tags, from the read object.

Also, although the read sensors herein are placed in storage shelves, it is equally possible to provide the read sensors in various ways, such as affixing the read sensors on the side walls, and so on.

The disclosure of Japanese Patent Application No. 2013-197358, filed on Sep. 24, 2013, including the specification, drawings and abstract, is incorporated herein by reference in its entirety.

The read sensor and management system according to the present invention are suitable for use to read information from the read object such as radio tags in a non-contact manner.

What is claimed is:

1. A read sensor comprising:
a dielectric plate that has a predetermined permittivity;
conductive elements, that are provided on a first plane of the dielectric plate, and that, by receiving a supply of current, generate electromagnetic waves and acquire data from a read object in a non-contact manner;
a metal plate that covers a second plane of the dielectric plate, which is a back plane of the first plane; and
perturbation elements that are provided on the first plane and connected to the conductive elements, wherein:
the conductive elements are formed with first elements of a linear shape and second elements of a linear shape, have a shape in which the first elements and the second elements are connected with each other, as if drawn unicursally in one stroke, so that an angle formed between a first element and a second element becomes a predetermined sharp angle, and acquire the data using a magnetic field or an electric field depending on a distance to the read object;
the first elements and the second elements have current supply parts that connect with a device that supplies current, in edge parts of the first elements and the second elements in a long direction; and
the perturbation elements are provided to extend between the first elements and the second elements, from side edge parts located between the current supply parts and centers of the first elements or the second elements having the current supply parts in the long direction, and match impedance in the current supply parts.

2. The read sensor according to claim 1, wherein:
the dielectric plate has a rectangular shape on a plan view; and
the conductive elements have connecting parts where the first elements and the second elements are connected, and are provided on the first plane so that a straight line to connect between neighboring connecting parts becomes parallel to two opposing sides of the dielectric plate.

3. The read sensor according to claim 1, wherein the predetermined sharp angle is greater than 8° and is equal to or less than 20°.

4. The read sensor according to claim 1, wherein:
the number of the first elements is equal to or greater than 2 and equal to or less than 4; and
the number of the second elements is equal to or greater than 2 and equal to or less than 4, and is the same as the number of the first elements.

5. The read sensor according to claim 1, wherein a plurality of conductive elements are aligned on the first plane at predetermined intervals.

6. The read sensor according to claim 5, further comprising an antenna switching part that switches between the conductive elements and supplies current to one after another.

7. The read sensor according to claim 1, wherein the dielectric plate is made of expandable plastic.

8. The read sensor according to claim 1, wherein the dielectric plate has a rectangular shape on a plan view, and has its length in a width direction made to match a depth of a shelf where an article to which the read object is attached is stored.

9. A management system comprising:
the read sensor of claim 1;
a reading device that reads information which the read sensor acquires from the read object; and
a terminal device that manages the information read by the reading device.

* * * * *